United States Patent [19]

Lockett et al.

[11] Patent Number: 4,929,399
[45] Date of Patent: May 29, 1990

[54] STRUCTURED COLUMN PACKING WITH LIQUID HOLDUP

[75] Inventors: Michael J. Lockett; Richard A. Victor, both of Grand Island, N.Y.

[73] Assignee: Union Carbide Industrial Gases Technology Inc., Danbury, Conn.

[21] Appl. No.: 420,825

[22] Filed: Oct. 12, 1989

Related U.S. Application Data

[63] Continuation of Ser. No. 169,592, Mar. 17, 1988, abandoned.

[51] Int. Cl.$^5$ ................................................ B01F 3/04
[52] U.S. Cl. .................................. 261/112.2; 428/131; 428/183
[58] Field of Search ...................... 261/112.2; 428/183, 428/131

[56] References Cited

U.S. PATENT DOCUMENTS

| | | | |
|---|---|---|---|
| D.254,506 | 3/1980 | Holmberg | 261/112.2 |
| 2,350,347 | 6/1944 | Gaugler | 261/99 |
| 2,665,123 | 1/1954 | Foster et al. | 261/108 |
| 3,285,587 | 11/1966 | Huber | 261/96 |
| 3,351,441 | 11/1967 | Gewiss | 428/183 |
| 3,540,702 | 11/1970 | Uyama | 261/112.2 |
| 3,618,778 | 11/1971 | Benton | 261/112.2 |
| 3,785,620 | 1/1974 | Huber | 259/4 |
| 3,963,810 | 6/1976 | Holmberg et al. | 261/112.2 |
| 4,186,159 | 1/1980 | Huber | 261/112 |
| 4,296,050 | 10/1981 | Meier | 261/112 |
| 4,597,916 | 7/1986 | Chen | 261/94 |
| 4,604,247 | 8/1986 | Chen et al. | 261/94 |
| 4,643,853 | 2/1987 | Braun | 261/112 |
| 4,670,196 | 6/1987 | Hsia | 261/112 |
| 4,675,103 | 6/1987 | Nadudvari et al. | 261/112.2 |

FOREIGN PATENT DOCUMENTS

| | | | |
|---|---|---|---|
| 2810094 | 10/1978 | Fed. Rep. of Germany | 261/112.2 |
| 1020190 | 2/1966 | United Kingdom | |
| 1316136 | 5/1973 | United Kingdom | 261/112.2 |

*Primary Examiner*—Tim Miles
*Attorney, Agent, or Firm*—Stanley Ktorides; Lawrence G. Kastriner

[57] ABSTRACT

Structured column packing having a fluted surface wherein the flute elevation forms a shelf sufficient to cause downflowing liquid to pool on the shelf thereby enabling more efficient countercurrent vapor-liquid mass transfer.

12 Claims, 2 Drawing Sheets

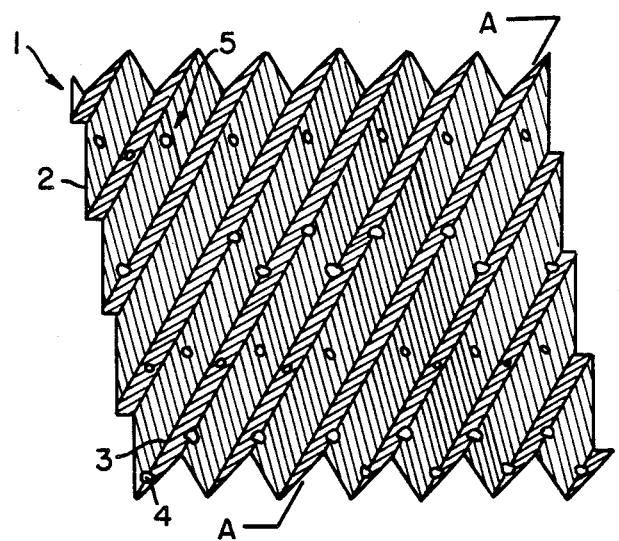
FIG. 1
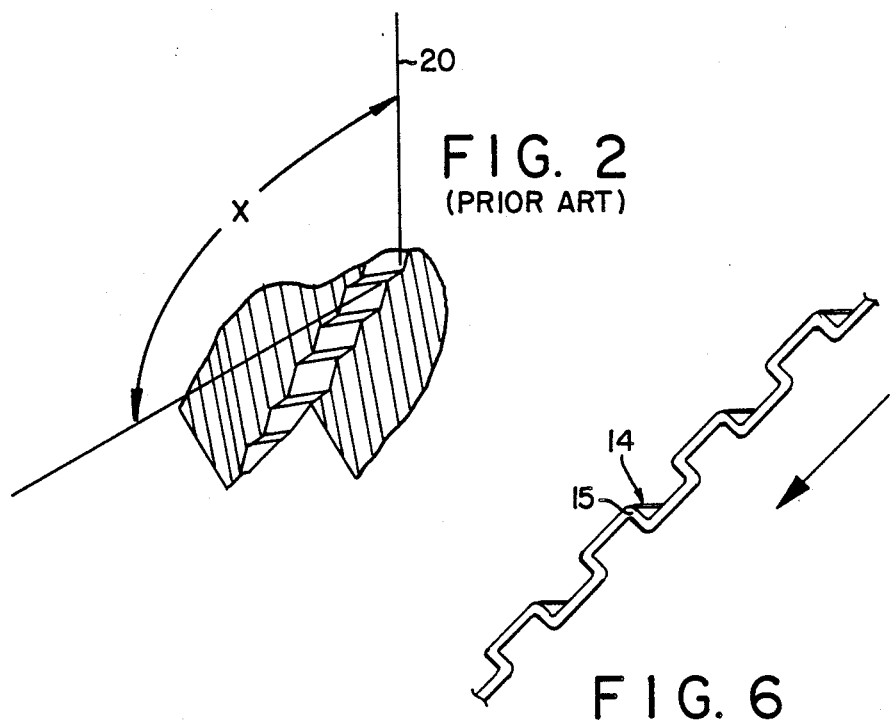
FIG. 2
(PRIOR ART)
FIG. 6

4,929,399

STRUCTURED COLUMN PACKING WITH LIQUID HOLDUP

This is a continuation of prior U.S. application Ser. No. 169,592, filing date Mar. 17, 1988 now abandoned.

TECHNICAL FIELD

This invention relates generally to structured column packing and in particular to structured column packing having a textured surface.

BACKGROUND ART

In a column, such as a distillation or an absorption column, mass transfer is carried out by the upflow of vapor against countercurrent downflow of liquid. In order to enhance the effectiveness of the mass transfer while avoiding a large pressure drop across the column, packing may be employed within the column. The packing may be random packing or structured packing. Structured packing is preferred for more rigorous separations such as the cryogenic distillation of air into nitrogen, oxygen or other atmospheric gases.

Generally structured packing comprises a corrugated sheet of metal or other suitable material. The sheets are vertically oriented within a column with the corrugations at an angle to the column axis. Generally this angle is about 45 degrees. The sheets are stacked within the column side by side such that each sheet has adjacent sheets on which the corrugations are reversed in direction relative to the vertical axis of the column. The height of each stack of packing is generally within the range of from 6 to 10 inches and each stack is placed in the column with the direction of its metal sheets at an angle, generally 90 degrees to the stacks immediately above and below it. The sheets may contain perforations to allow liquid to pass freely onto both sides of the sheets and also to equalize vapor flow in the channels formed between adjacent sheets.

A recent advance in structured column packing is the packing disclosed in U.S. Pat. No. 4,186,159 Huber and in U.S. Pat. No. 4,296,050-Meier. This packing is characterized by fluting on the surface of the corrugated packing sheet. The fluting is a roughening of the sheet surface by grooving or by the impression of a pattern, for example a herringbone pattern, and serves to improve liquid distribution over the sheet surface by capillary action and channelling. The predominant mechanism causing liquid to spread laterally over the packing surface is weak surface tension forces acting along the flutes. The liquid holdup on the packing sheet is relatively small.

Since liquid holdup on the packing sheet will increase the vapor-liquid contact time and thus the mass transfer effectiveness, it is desirable to have structured column packing which enables liquid holdup on the packing surface which exceeds that possible with presently available packing.

Accordingly it is an object of this invention to provide improved fluted structured column packing which enables improved liquid holdup of downflowing liquid along its surface.

It is another object of this invention to provide improved fluted structured column packing which enables increased liquid-vapor contact time for liquid and vapor flowing countercurrently through a given height of packing.

It is a further object of this invention to provide improved fluted structured column packing which enables increased mass transfer through a given height of packing without a significant increase in vapor pressure drop over the given height.

SUMMARY OF THE INVENTION

The above and other objects which will become apparent to one skilled in the art upon a reading of this disclosure are attained by the present invention one aspect of which is:

A column packing element comprising a corrugated sheet and a plurality of flutes laterally disposed on said sheet, each said flute comprising an elevation with respect to said sheet, the elevation disposed at an angle to said sheet such that when the packing element is vertically oriented, the elevation angle is 90 degrees or less with respect to the vertical, thereby forming a shelf along the sheet sufficient to cause liquid flowing down the packing element to form a pool on said shelf.

Another aspect of the present invention is:

A method for carrying out mass transfer between vapor and liquid comprising countercurrently passing vapor up and passing liquid down a column containing a plurality of packing elements vertically disposed within said column, said packing elements each comprising a corrugated sheet and a plurality of flutes laterally disposed on said sheet, each said flute comprising an elevation with respect to said sheet, the elevation disposed at an angle of 90 degrees or less with respect to the vertical thereby forming a shelf along the sheet, and forming a pool comprised of downflowing liquid on the shelf.

The term, "column", as used herein means a contacting column or zone wherein liquid and vapor phases are countercurrently contacted to effect separation of a fluid mixture by contacting of the vapor and liquid phases on packing elements within the column. For a further discussion of distillation columns see the Chemical Engineers' Handbook. Fifth Edition, edited by R. H. Perry and C. H. Chilton, McGraw-Hill Book Company, New York, Section 13, "Distillation" B. D. Smith et al, page 13-3 The Continuous Distillation Process.

BRIEF DESCRIPTION OF THE DRAWINGS

FIG. 1 is a perspective view of a sheet of fluted structured column packing.

FIG. 2 is a detailed view of a known fluted structured column packing.

FIG. 6 is a cross-sectional detail view an embodiment of the fluted structured column packing of the invention showing the liquid holdup.

DETAILED DESCRIPTION

The invention will be described in detail with reference to the Drawings.

Referring now to FIG. 1 column packing element 1 comprises a corrugated sheet 2 having corrugations 3 oriented at an angle to the vertical. The angle is generally within the range of from 15 to 60 degrees. The angle of the corrugations of the packing element illustrated in FIG. 1 is 45 degrees. Corrugated sheet 2 is preferably made of metal such as aluminum or steel. Other materials suitable for use to fabricate corrugated sheet 2 include non-metallic materials such as plastic or fiberglass.

Corrugated sheet 2 may contain one or more perforations, such as shown at 4, to allow liquid to pass onto both sides of the sheet and equalize vapor flow.

Corrugated sheet 2 contains a plurality of flutes 5 laterally disposed on the sheet. Three embodiments of the flutes of the present invention are shown in FIGS. 3–5 which show the flute as they would look in cross-section of a detail of FIG. 1 taken along line A—A.

Figure 3:
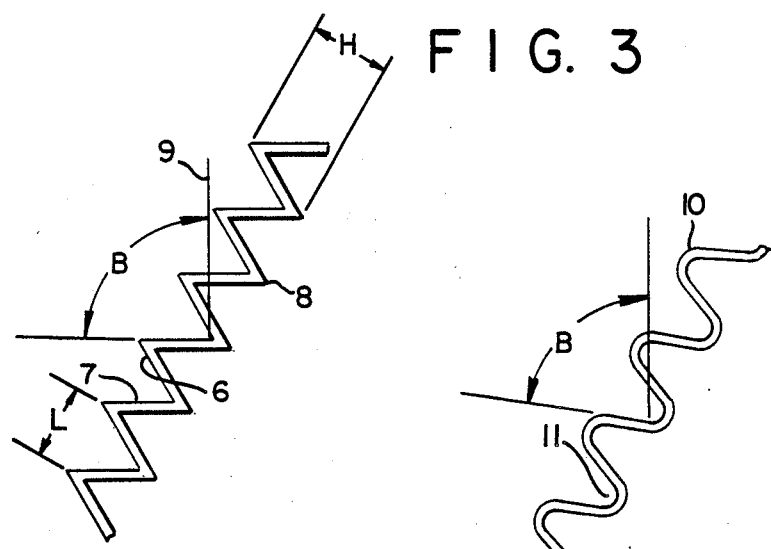
FIG. 3 is a cross-sectional detail view of one embodiment of the fluted structured column packing of the invention.

Referring now to FIG. 3, flutes 6 each comprise an elevation 7 with respect to sheet 8. The elevation is disposed at an angle to the sheet such that, when the packing element is vertically oriented, the angle B formed by the elevation to the vertical 9 is 90 degrees or less. Preferably this elevation angle is within the range of from 45 to 85 degrees.

The flutes of the packing element of the invention have a height H from trough to peak generally within the range of from 0.05 to 10 millimeters, preferably within the range of from 0.5 to 2.0 millimeters, and a lateral length L from peak to peak generally within the range of from 0.5 to 10.0 millimeters.

Figure 4:
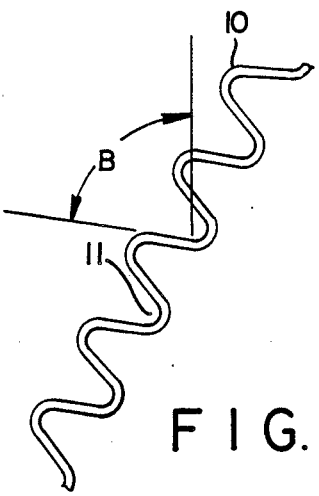
FIG. 4 is a cross-sectional detail view of another embodiment of the fluted structured column packing of the invention.
Figure 5:
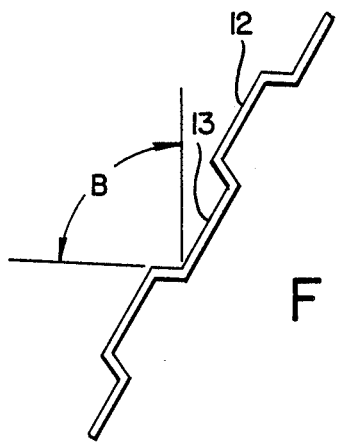
FIG. 5 is a cross-sectional detail view of a third embodiment of the fluted structured column packing of the invention.

FIGS. 4 and 5 illustrate two other embodiments of the flutes of the packing element of the invention. Whereas the flutes illustrated in FIG. 3 are characterized by sharp angled peaks and troughs, the flutes illustrated in FIG. 4 have curved peaks 10 and troughs 11 and the flutes illustrated in FIG. 5 have peaks 12 and troughs 13 which have flat surfaces. Generally, any particular packing element will have a single type of flute; however different types of flutes may, if desired, be on the same packing element. Although the embodiments illustrated in FIGS. 3–5 are all two-sided, one-sided embodiments are acceptable alternatives. For example, the packing element could have flutes on the upper surfaces and a flat surface on the underside. Another alternative could have flutes on both sides, but with material thickness between the two sides.

In each case elevation 7 forms a shelf or ledge along the sheet. As liquid flows down the packing element in the direction of the arrow, the angle of the shelf with respect to the vertical causes the liquid to form a pool 14 on the shelf 15, such as shown in FIG. 6. This pooling of the liquid causes several advantageous effects to occur. First, the liquid is more effectively spread over the surface of the packing. Since the liquid is physically contained by the shelf or ledge, it tends to flow laterally over the packing surface until it spills over the shelf or ledge edge. Second, pooling increases liquid holdup allowing for longer liquid-vapor contact time through a given height of packing. Third, the pooling more effectively mixes the downwardly flowing liquid. Fourth, the liquid film passing down the packing element is more effectively disrupted by the flow over the shelf or ledge edge bringing fresh liquid to the surface and this better promoting mass transfer. The overall result of these advantages is increased mass transfer as indicated by a reduction in HETP (height equivalent to a theoretical plate) without an increase in vapor pressure drop per theoretical plate.

For comparative purposes there is illustrated in FIG. 2 a detail view of the fluting of the heretofore available fluted structured column packing as disclosed in U.S. Pat. Nos. 4,186,159 and 4,296,050. As is clearly seen from FIG. 2, the elevation of the flutes forms an angle X which clearly exceeds 90 degrees from the vertical 20.

The following is presented to further illustrate the invention and the advantages attainable thereby.

A liquid mixture comprising about 65 to 85 percent oxygen and 15 to 35 percent nitrogen was separated using low temperature fractional distillation in a test column having an internal diameter of 4 inches and having packing in a packing height of 30 inches. The packing was structured packing of corrugated aluminum having a surface area density of 140 square feet per cubic foot and set vertically in the column so that the corrugations were at an angle of 45 degrees to the column axis. The packing had fluting of the type illustrated in FIG. 5. The fluting height was 0.25 millimeters, the fluting length was 3.5 millimeters and the elevation angle was about 85 degrees. The column was operated at total reflux at a pressure of 25 pounds per square inch absolute. The column was operated at several different vapor flowrates and measurements were taken at each such vapor flowrate.

For comparative purposes a procedure similar to that described above was carried out except that the packing was commercially available packing of the type illustrated in FIG. 2. The packing was made of corrugated aluminum having a surface area density of 136 square feet per cubic foot and was set vertically in the column with the corrugations set at an angle of 45 degrees to the column axis.

The performance of the two packings was measured by obtaining the HETP for each packing at a range of column capacity factors from 0.09 to 0.14 feet/second. A theoretical plate is defined as a discrete contacting stage for the liquid and gas phases so that the exiting liquid and gas are in mass transfer equilibrium. The capacity factor is defined as the product of the superficial vapor velocity and the square root of the ratio of the vapor density divided by the difference between the liquid and vapor densities. For measurements over the entire capacity range, the improved structured column packing of the invention enabled better mass transfer performance as demonstrated by its HETP of about 0.9 compared to the normalized HETP value of 1.0 for the commercially available structured column packing.

It is thus shown that the improved structured column packing with the liquid holdup of the present invention provided a reduction of about 10 percent in HETP over that attainable by the heretofore available fluted structured column packing.

Although the fluted structured column packing of this invention has been described in detail with reference to certain embodiments, those skilled in the art will recognize that there are other embodiments of the invention within the spirit and scope of the claims.

We claim:

1. A column packing element comprising a corrugated sheet having a top and a bottom and a plurality of flutes laterally disposed on said sheet, each said flute comprising an elevation with respect to said sheet, the elevation disposed at an angle to said sheet, said elevation angle being 90 degrees or less with respect to an axis from said top to said bottom thereby forming a shelf along the sheet sufficient to cause liquid flowing down the packing element to form a pool on said shelf.

2. The column packing element of claim 1 wherein the elevation angle is within the range of from 45 to 85 degrees.

3. The column packing element of claim 1 wherein each said flute has a height within the range of from 0.05 to 10.0 millimeters.

4. The column packing element of claim 1 wherein each said flute has a length within the range of from 0.5 to 10.0 millimeters.

5. The column packing element of claim 1 wherein the flutes comprise sharp angled peaks and troughs.

6. The column packing element of claim 1 wherein the flutes comprise curved peaks and troughs.

7. The column packing element of claim 1 wherein the flutes comprise flat surfaced peaks and troughs.

8. The column packing element of claim 1 wherein the corrugated sheet is made of metal.

9. The column packing element of claim 8 wherein the metal is aluminum.

10. The column packing element of claim 1 wherein the corrugated sheet contains one or more perforations.

11. A method for carrying out mass transfer between vapor and liquid comprising countercurrently passing vapor up and passing liquid down a column containing a plurality of packing elements vertically disposed within said column, said packing elements each comprising a corrugated sheet and a plurality of flutes laterally disposed on said sheet, each said flute comprising an elevation with respect to said sheet, the elevation disposed at an angle of 90 degrees or less with respect to the vertical thereby forming a shelf along the sheet, and forming a pool comprised of downflow in liquid on the shelf.

12. The method of claim 11 wherein the vapor and liquid are each comprised of oxygen and nitrogen.

* * * * *

UNITED STATES PATENT AND TRADEMARK OFFICE
CERTIFICATE OF CORRECTION

PATENT NO. : 4,929,399
DATED : May 29, 1990
INVENTOR(S) : M.J. Lockett et al

It is certified that error appears in the above-identified patent and that said Letters Patent is hereby corrected as shown below:

In column 3, line 61 delete "this" and insert therefor --thus--.

In claim 11, line 11 delete "downflow in" and insert therefor --downflowing--.

Signed and Sealed this

Thirteenth Day of August, 1991

Attest:

HARRY F. MANBECK, JR.

*Attesting Officer*  *Commissioner of Patents and Trademarks*